UNITED STATES PATENT OFFICE

ERNEST HEY, OF BELLINGHAM, WASHINGTON

PROCESS OF CLEANING AND CHANGING THE COLOR OF ROSIN

No Drawing.   Application filed May 4, 1927. Serial No. 188,870.

My invention relates to a process of cleaning and changing the color of rosin.

Rosins are characteristically of a yellowish to a brown color, some being almost black, especially is the rosin from stumps as contrasted with the rosin obtained from the sap of living trees particularly dark in color.

A primary object of my invention is to clean and change the color of said rosin to a very light color and even almost white.

A further primary object of my invention is to render said rosin transparent.

A further object of my invention is to provide as an article of manufacture a rosin having any desired odor.

I treat rosin, particularly the dark variety of rosin, in any suitable solvent, such as ether, alcohol or gasoline. I next provide a solution of commercial hydrochloric acid and water in which I place zinc to create an active reaction between the said metal and solution. I carefully scatter the zinc evenly over the bottom of the vessel and after the activity reaches the stage of active ebullition of gas I then submerge the solution of rosin in a container which is not subject to being acted upon by the hydrochloric acid, said container being closed with a cap of zinc, which cap is provided with a number of small openings of pinhead proportions. When the rosin solution becomes warmed by the interaction of the zinc and acid it tends to rise or expand and pass upwardly through the holes in said cap. This requires that the container of the rosin solution must be carefully weighted down. Since the acid acts upon the walls of the small openings of the cap they are gradually made larger, and for this reason clogging or stopping of these perforations is prevented. It seems important that there be a certain amount of heat provided and at the same time there should be a gradual releasing of the rosin solution, the more gradual the better. By submerging the container of the rosin solution at the time when the boiling activity is in full progress, i. e., when the fast moving currents are developed in the solution, there is obtained sufficient heat for the rosin solution and at the same time there is prevented too rapid action upon the zinc cap so that the gradual releasing of the rosin solution is provided.

As the rosin gradually emerges through the openings of the zinc cap it is picked up by the currents and carried around about through the solution, and the rosin gradually forms on the surface of the solution as a thick syrupy film, said film becoming thicker and thicker as the process continues. After this film is removed and allowed to cool, it assumes its hard solid form. The quantity thus resulting is substantially the same amount as put in. I have noted about two per cent (2%) loss.

A further important fact seems to be that the deeper the container of the rosin solution is submerged, i. e., the greater the column of solution above the zinc cap, the greater the degree of transparency imparted to the rosin.

Furthermore, in changing the proportions of the water and acid, I note that a change of color is also effected. The greater the proportion of acid to water the darker is the product; in other words, the more water that can be employed the more transparent is the rosin product.

In general, the following formula has been found to give a very light product:

About 1 lb. of rosin may be dissolved in any suitable rosin dissolvent. It is not material, however, just how much rosin is used. 1 gallon of commercial hydrochloric acid is mixed with 8 gallons of water. Into this is placed about 2½ lbs. of zinc in ingot form preferably. The rosin solution is placed in about a one quart container, and on top of this container the zinc cap is secured having small perforations as above described. This is submerged into the acid and water solution upside down so as to provide as great a column above the escaping rosin solution as possible. The escaping rosin solution upon coming in contact with the zinc ingots at the bottom seems to coat the same and retards the violent action. Also the adding of dissolved citric acid crystals to the rosin solution has the effect of making more transparent the rosin product.

It has been noted that adding an odor emitting compound to the rosin solution provides a rosin product which has the property of emitting the particular odor characteristic of said compound for a long period of time, practically indefinitely. For example, a clove solution may be provided and added to the rosin solution, or camphor may be inserted in this manner. The refined rosin product resulting from the above process may be used for any of the purposes for which rosin is now employed.

If it is desired to have rosin free of other substances, it is necessary to use a non-metallic container, or at least no metallic container other than zinc should be used, since it is noted that in the case of an iron container the rosin absorbs some of the metal extracted by the acid.

I claim:

1. The process of cleaning and changing the color of rosin comprising the steps of dissolving natural rosin in a rosin organic solvent; placing the rosin in a closed container having one wall of zinc provided with small perforations; forming a second solution of hydrochloric acid and water; placing zinc in said last named solution; and submerging said container and contents in said second solution, whereby the said solution of rosin is caused to pass through said metal wall and after being thoroughly agitated in the said second solution the rosin will separate and rise to the top.

2. The process of cleaning and changing the color of rosin comprising the steps of dissolving natural rosin in a rosin organic solvent; placing the rosin solution in a container having a zinc cap provided with small perforations; forming a second solution of hydrochloric acid and water; placing zinc in said last named solution; and during the time when the interaction between said second solution and the zinc becomes very active, submerging said container and contents in said second solution, whereby the said solution of rosin is caused to pass through said cap and after being thoroughly agitated in the said second solution the rosin will separate and rise to the top.

3. The process of cleaning and changing the color of rosin comprising the steps of dissolving natural rosin in a rosin organic solvent; placing the rosin in a closed container having one wall of zinc provided with small perforations; adding an odor producing compound to said rosin solution; forming a second solution of hydrochloric acid and water; placing zinc in said last named solution; and submerging said container and contents in said second solution, whereby the said solution of rosin is caused to pass through said metal wall and after being thoroughly agitated in the said second solution the rosin will separate and rise to the top.

4. The process of cleaning and changing the color of rosin comprising the steps of dissolving natural rosin in a rosin organic solvent; placing the rosin solution in a container having a zinc cap provided with small perforations; adding an odor producing compound to said rosin solution; forming a second solution of hydrochloric acid and water; placing zinc in said last named solution; and during the time when the intersection between said second solution and the zinc becomes very active, submerging said container and contents in said second solution whereby the said solution of rosins is caused to pass through said cap and after being thoroughly agitated in the said second solution the rosin will separate and rise to the top.

5. The process of cleaning and changing the color of rosin comprising the steps of dissolving natural rosin in a rosin organic solvent and adding citric acid crystals in a solution thereof; placing the rosin solution in a container having a zinc cap provided with small perforations; forming a second solution of hydrochloric acid and water; placing zinc in said last named solution; and during the time when the interaction between said second solution and the zinc becomes very active, submerging said container and contents in said second solution, whereby the said solution of rosin is caused to pass through said cap and after being thoroughly agitated in the said second solution the rosin will separate and rise to the top.

6. The process of cleaning and changing the color of rosin comprising the steps of dissolving natural rosin in a rosin organic solvent; placing the rosin in a closed container having one wall of zinc provided with small perforations; forming a second solution of hydrochloric acid and water; placing zinc in said last named solution; submerging said container and contents in said second solution, whereby the said solution of rosin is caused to pass through said metal wall and after being thoroughly agitated in the said second solution the rosin reaction product is caused to separate and rise to the top; and regulating the degree of transparency of said reaction product by varying the height of the said liquid column above said perforated zinc wall.

7. The process of cleaning and changing the color of rosin, comprising the steps of forming a solution of natural rosin; forming a second solution of hydrochloric acid and water; adding zinc to said second solution; and slowly releasing said first solution into and beneath the surface of the second solution, while said second solution is reacting upon the zinc.

8. The process of cleaning and changing the color of rosin, comprising the steps of forming a solution of natural rosin; adding an odor emitting substance to said first solution; forming a second solution of hydrochloric acid and water; adding zinc to said second solution; and slowly releasing said first solution into and beneath the surface of the second solution, while said second solution is reacting upon the zinc, whereby a coating of rosin forms on the top of said second solution.

9. The process of cleaning and changing the color of rosin, comprising the steps of forming a solution of natural rosin; adding a solution of citric acid crystals to said second solution; forming a second solution of hydrochloric acid and water; adding zinc to said second solution; and slowly releasing said first solution into and beneath the surface of the second solution, while said second solution is reacting upon the zinc, whereby a coating of rosin forms on the top of said second solution.

10. The process of cleaning and changing the color of rosin, comprising the steps of dissolving natural rosin in a rosin solvent; placing the rosin in a closed container having one wall of zinc provided with small perforations; forming a second solution of hydrochloric acid and water; placing zinc in said last named solution and submerging said container and contents in said second solution, while the reaction is taking place between said zinc and the second solution, whereby the second solution of rosin passes through said perforations in said metal wall and the rosin rises in said second solution and forms a coating of rosin on the top thereof.

In witness whereof, I hereunto subscribe my name this 29th day of April, 1927.

ERNEST HEY.